Aug. 4, 1925.
R. M. CAROTHERS
1,548,775
REGULATING SYSTEM
Filed Aug. 18, 1924
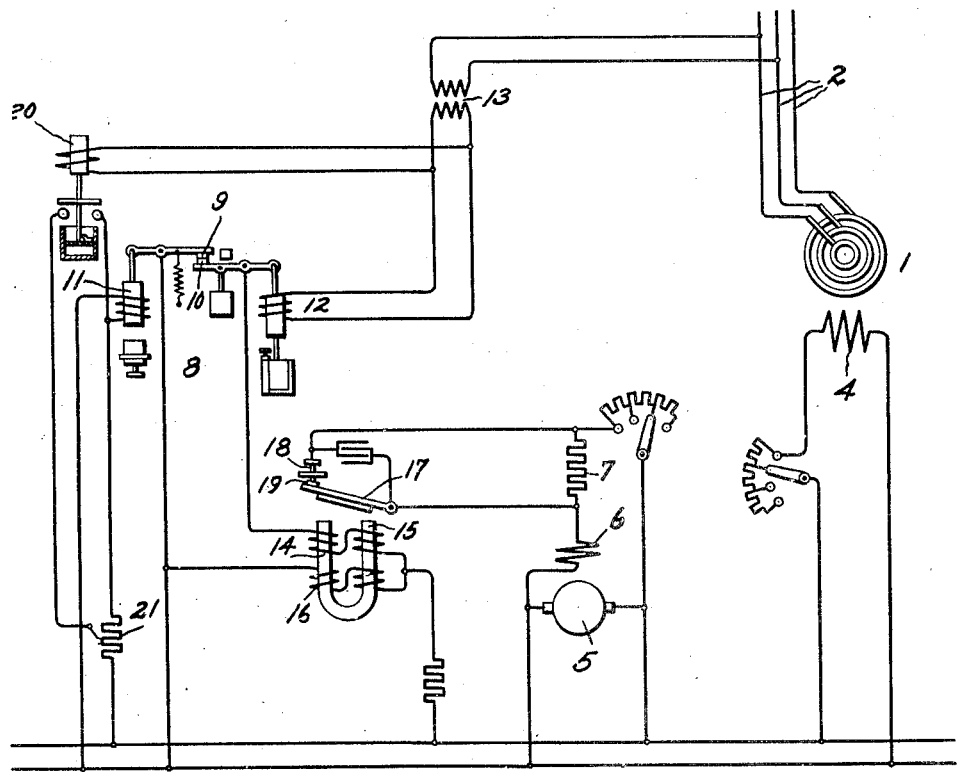
Inventor:
Robert M. Carothers;
by *[signature]*
His Attorney.

Patented Aug. 4, 1925.

1,548,775

UNITED STATES PATENT OFFICE.

ROBERT M. CAROTHERS, OF SCHENECTADY, NEW YORK, ASSIGNOR TO GENERAL ELECTRIC COMPANY, A CORPORATION OF NEW YORK.

REGULATING SYSTEM.

Application filed August 18, 1924. Serial No. 732,759.

*To all whom it may concern:*

Be it known that I, ROBERT M. CAROTHERS, a citizen of the United States, residing at Schenectady, in the county of Schenectady, State of New York, have invented certain new and useful Improvements in Regulating Systems, of which the following is a specification.

My invention relates to regulating systems for controlling a characteristic of the output of a generator and particularly to a system in which the characteristic which may be the voltage, current, power, power factor, etc., is controlled by varying the excitation of an exciter which supplies exciting current to the generator.

My invention is of particular utility in systems for controlling the voltage of the output of a generator. Since the voltage of a generator tends to decrease as the load connected thereto increases, the voltage regulator for a generator has to effect an increase in the excitation of the exciter as the load increases in order to maintain a constant voltage. Therefore, when an overload or short circuit occurs, the voltage regulator operates to increase the excitation of the exciter so that the current supplied to the overload or short circuit is increased still further. It is desirable, however, that under such abnormal load conditions, the regulator should operate so that the current supplied by the generator is decreased instead of increased.

One object of my invention is to provide in a regulating system an improved arrangement for rendering the regulator inoperative to maintain constant the desired characteristic of the output of a generator when another predetermined characteristic of the output of the generator occurs.

My invention will be better understood from the following description, taken in connection with the accompanying drawing, and its scope will be pointed out in the appended claims.

The accompanying drawing shows diagrammatically a voltage regulator of the well known Tirrill type, which embodies my invention.

Referring to the drawing, 1 represents a generator the voltage of which is to be maintained constant. As shown, the generator 1 is an alternator which is connected to an alternating current circuit 2, but it is evident that my invention is not limited to any particular type of generator. The generator 1 is provided with a field winding 4 which is excited by a suitable source of current shown as an exciter 5. The exciter 5 is provided with a shunt field winding 6 and a resistance 7 in series therewith which is arranged to be short circuited by a Tirrill regulator 8.

The regulator 8 as shown is of the well known construction comprising two cooperating contacts 9 and 10 which are actuated respectively by a direct current magnet 11 connected across the exciter 5 and an alternating current magnet 12 connected across the alternating current circuit 2 by means of a potential transformer 13. The two contacts 9 and 10 are connected in the circuit of one of the windings 14 of a differential magnet 15, this circuit being connected across the exciter 5. The other winding 16 of the differential magnet 15 is permanently connected across the exciter 5. The differential magnet 15 has a pivoted armature 17 which is arranged to close the contacts 18 and 19, when both the windings 14 and 16 are energized, so as to short circuit the resistance 7 in the field circuit of the exciter 5.

The operation of the regulator shown is well known in the art. It is evident that the exciter voltage is controlled by the rapid opening and closing of the contacts 9 and 10 and that the exciter voltage depends upon the length of time the contacts remain in engagement during each vibration. Furthermore, it is evident that the length of time the contacts 9 and 10 remain in engagement with each other depends upon the load connected to the alternating current circuit 2. At any constant load the contact 10 remains stationary and the contact 9 vibrates so that the regulator acts as a direct current regulator to maintain the proper exciter voltage. When the load on the generator 1 increases, the voltage of the generator tends to decrease so that the contact 10 moves towards the contact 9. Consequently, the contacts 9 and 10 are in engagement a greater proportion of the time during each vibration of the contact 9. Therefore, the resistor 7 is short circuited more of the time which, in turn, causes the exciter voltage to increase. When the exciter voltage reaches a value corresponding to that required to give normal alternating current voltage under the new load conditions, the alternating current magnet 12 remains stationary in its new position and the direct current magnet 11 then operates to maintain the exciter voltage at this higher value in order to hold the desired alternating current voltage. As the load on the generator increases, the contacts 9 and 10 move closer together so that the resistor 7 is short circuited more of the time until finally, when the load reaches a predetermined abnormal value, the contacts 9 and 10 remain in engagement with each other all of the time so that the exciter voltage builds up to its maximum value. Obviously, under such conditions, the current supplied to the abnormal demand may be sufficient to damage the generator.

Therefore, it is very desirable that suitable means should be provided for modifying the operation of the regulator so that the output of the generator is decreased under such abnormal load conditions.

In order to accomplish this result, I provide an arrangement whereby the regulator 8 operates to maintain the exciter voltage 5 constant at a low value under abnormal load conditions. My improved arrangement consists in providing a magnet 20 which is arranged to short circuit the resistor 21 or a portion thereof in the circuit of the magnet 11, when the generator voltage decreases below a predetermined value. The amount of resistance in the circuit of the magnet 11 that the magnet 20 is arranged to short circuit, is such that when the resistance is short circuited the magnet 11 operates in response to a low exciter voltage to separate the contacts 9 and 10.

Under normal load conditions, the generator voltage is sufficient to cause the relay 20 to maintain its contacts open so that the resistor 21 is in series with the coil of the magnet 11. Under these conditions, the regulator 8 operates in the well known manner to maintain a constant generator voltage.

When, however, an excessive overload or short circuit occurs, the generator voltage decreases so that the energization of the magnet 12 is decreased sufficiently to cause the core of the magnet 12 to drop to its lowest position. If no other means were provided, this movement of the core of the magnet would increase the excitation of the exciter to its maximum value, thereby increasing the voltage of the generator and causing the generator to supply more current to the abnormal load. The magnet 11 vibrates the contact 9 under these conditions to maintain a constant exciter voltage, the value of which depends upon the calibration of the magnet 11.

In order to decrease the output of the generator 1 under such abnormal load conditions, the voltage relay 20 is arranged to short circuit a portion of the resistor 21 in the circuit of the magnet 11 so that the magnet will operate in response to a lower exciter voltage and thereby maintain the exciter voltage constant at a lower voltage under such abnormal load conditions. Therefore, whenever a sufficient abnormal load is connected to the load circuit 2 to decrease the voltage of the generator below a predetermined value, the relay 20 operates to short circuit a portion of the resistor 21 so that regulator 8 operates as a direct current regulator to maintain the exciter voltage constant at a predetermined low value. In this way the generator voltage is decreased so that the output of the generator is limited to a safe operating value.

While I have in accordance with the Patent Statutes shown and described my invention as applied to a particular system, and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In a regulating system, a generator, an exciter therefor, a pair of cooperating contacts arranged to control by their engagement and disengagement the excitation of said exciter, means operative in response to a characteristic of the output of said generator for actuating one of said contacts, a magnet operative in response to a predetermined characteristic of said exciter for actuating the other one of said contacts, a circuit for said last-mentioned magnet, and means responsive to a predetermined characteristic of the output of the generator for controlling said circuit.

2. In a regulating system, a generator, an exciter therefor, a magnet operative in response to the voltage of said generator for controlling the excitation of said exciter, a magnet operative in response to the voltage of said exciter for controlling the excitation thereof, and a magnet responsive to the voltage of said generator for controlling the operation of said magnet which is responsive to the exciter voltage.

3. In a regulating system, a generator, an exciter therefor, a pair of cooperating contacts arranged to control by their engagement and disengagement the excitation of said exciter, a magnet operative in response to a characteristic of the output of said generator for actuating one of said contacts, a magnet operative in response to a characteristic of the output of the exciter for actuating the other one of said contacts, and means operative in response to a predetermined characteristic of the output of said generator for controlling the operation of said last-mentioned magnet.

4. In a regulating system, a generator, an exciter therefor, a pair of cooperating contacts arranged to control by their engagement and disengagement the voltage of said exciter, a magnet responsive to the voltage of said generator for actuating one of said contacts, a magnet responsive to the voltage of said exciter for actuating the other one of said contacts, current limiting means in the circuit of said last-mentioned magnet, and a magnet controlled by the voltage of said generator for controlling a short circuit around said current limiting means.

5. In a regulating system, a generator, an exciter therefor, a pair of cooperating contacts arranged to control by their engagement and disengagement the voltage of said exciter, a magnet responsive to the voltage of said generator for actuating one of said contacts, a magnet responsive to the voltage of said exciter for actuating the other one of said contacts, current limiting means in the circuit of said last-mentioned magnet, and means for short circuiting said current limiting means when a predetermined overload occurs on said generator.

In witness whereof, I have hereunto set my hand this 15th day of August, 1924.

ROBERT M. CAROTHERS.